3,645,964
FIRE RETARDANT ACRYLONITRILE POLYMER COMPOSITIONS

Joseph di Pietro, Alma, Mich., assignor to Michigan Chemical Corporation, St. Louis, Mich.
No Drawing. Filed July 16, 1969, Ser. No. 842,383
Int. Cl. C09k 3/28
U.S. Cl. 260—45.7 P
3 Claims

ABSTRACT OF THE DISCLOSURE

Films or fibers formed from an acrylonitrile polymer are rendered flame retardant by treating the polymeric material with a chlorine-containing hydrocarbon such as a chlorine-containing alkyl phosphate or phosphonate, and a bromine-containing phosphate ester such as tris (2,3-dibromopropyl) phosphate, the molar proportion of Br to Cl in the treated polymer ranging from 3:1 to 1:3.

---

The present invention relates to the production of improved acrylonitrile polymers rendered flame retardant or self-extinguishing by incorporating therein a fire retardant additive containing a synergistic combination of a chlorine-containing hydrocarbon material and a bromine-containing phosphate ester.

The use of various additives for the purpose of reducing the flammability of thermoplastic polymers including acrylonitrile polymers is well known to those skilled in the art. Among the additives previously employed for such uses are various phosphorous-containing compounds including bromine-containing phosphate esters such as tris (2,3-dibromopropyl) phosphate. These phosphorous-containing compounds have generally been used alone or in combination with certain other flame retardant synergists, particularly antimony trioxide or an equivalent antimony-containing compound. Other materials such as chlorostyrene, chlorinated paraffin waxes, either alone or in admixture with antimony trioxide, have also been effective flame retardants for various resinous materials. However, there are distinct disadvantages in utilizing these known compounds and combinations of compounds. For one thing, it has usually been necessary to incorporate very large amounts, upwards of 35% by weight of the additive, into the polymer in order to render it reasonably flame retardant. Such large quantities of additives can, and often do, deleteriously affect the physical properties of the polymer.

Acrylonitrile polymer compositions have found acceptance in a wide variety of applications, especially in the production of textile materials such as carpets, wearing apparel and the like. However, they are at a considerable disadvantage in many of these applications due to a lack of flame resistance. And it has been difficult to improve appreciably the flame resistance of textiles, or textile materials containing them. Flameproofing procedures which have been especially adapted for other textile materials such as cellulosics cannot be extended to materials containing acrylic polymer fibers especially when such fibers are used in apparel or in carpet fabrics. The fiber resiliency and crushing resistance cannot be adversely affected and various chemical treatments which might otherwise be effective cannot be employed if they impart toxicity to the treated article, or if they affect the color or fastness of dyes adversely. Moreover, many of these additives tend to crystallize, or to migrate, or "oil out" of the polymer after a relatively short time; thus, rendering them less effective as fire retardants and causing other difficulties such as rendering a textile material easily soiled or discolored.

To overcome the lack of flame resistance of the acrylonitrile polymers, it has been proposed heretofore to adopt one of two general procedures. The acrylonitrile polymers may be polymerized or copolymerized with monomers which impart flame retardant characteristics to the polymer. On the other hand, a conventional polymer may be first produced and then treated either during the spinning of the fibers or filaments or after the fiber or film has been produced to render the fiber or film flame retardant. Copolymers or blends of acrylonitrile polymer compositions formed with the usual halogen-containing monomers have had limited success. For example, such compositions produced with polyvinyl chloride, polyvinylidene chloride, phosphonates and the like have produced fibers with good flame resistance in many instances, but such fibers have suffered from a lack of compatibility or permanence during the fiber forming processes, and often have not possessed as desirable physical properties as the conventional polymers intended for the same purpose.

Generally speaking, it has been found to be more practicable to add a flame retardant composition to the acrylonitrile polymer during or after the formation of the fiber or film, rather than adding a monomer which will copolymerize with the acrylonitrile monomer. In fact, it has been found that superior flame retardant properties can be imparted to the acrylonitrile polymer after the formation of the film or the fiber by incorporating into the polymer or mixing with it a synergistic combination or mixture of a chlorinated hydrocarbon material and a bromine-containing phosphate ester.

Such combinations or mixtures may be comprised of individual brominated and chlorinated additives, suitable additives which contain bromine and chlorine in the same molecule or, of course, admixtures of compounds of this nature. Certain combinations or admixtures of this character, as discovered in connection with the present invention, provide just as effective flame retardancy for the treated acrylonitrile polymers as either the bromine-containing or chlorine-containing additives when used individually, and provide it at lower concentrations. In short, a synergistic effect prevails. In order to obtain this synergistic effect, it is preferable to use bromine and chlorine-containing compounds in such proportions that there is added very nearly 1 mole of bromine (Br) to 1 mole of chlorine (Cl). However, these exact proportions do not have to be utilized, and the synergistic effect has been observed with additives in which the molar proportion of bromine to chlorine ranges from about 3:1 to 1:3. The total quantity of additive utilized will depend to a certain extent upon the use to which the acrylonitrile polymers are put. But generally speaking, not more than 10% by weight, based on the weight of the polymer, of the additive is required, although 15% or more could be used in some instances—see Table I. Although various specific examples of the invention which are illustrative thereof are given hereafter, it is preferred to use tris (2,3-dibromopropyl) phosphate as the bromine-containing material and a trimer of a chlorine-containing alkyl phosphonate such as "Phosgard" as the chlorine-containing material, to use approximately 80% by weight of the tris (2,3-dibromopropyl) phosphate to 20% by weight of the "Phosgard." "Phosgard" is a phosphonate trimer having approximately the formula $$ClCH_2CH_2O-\underset{\underset{ClCH_2-CH_2}{|}}{\overset{\overset{O}{\|}}{P}}-O-\underset{\underset{}{}}{\overset{\overset{CH_3\ O}{|\ \|}}{CH-P}}-O-\underset{\underset{OCH_2CH_2Cl}{|}}{\overset{\overset{CH_3\ O}{|\ \|}}{CH-P}}-(OCH_2CH_2Cl)_2$$

It is a product of the Monsanto Company, Organic Division, St. Louis, Missouri.

Acrylonitrile polymers useful in connection with the present invention include polyacrylonitrile and its copolymers or terpolymers, interpolymers and blends of acrylonitrile with other polymerizable monoolefinic materials, as well as blends of polyacrylonitrile and the polymerized monoolefinic materials with small amounts of other polymeric materials such as polystyrene. In general, a polymer formed from a monomeric mixture in which acrylonitrile is at least 80% by weight of the polymerizable content or a blend of polymers containing at least 80% of polymerized acrylonitrile is preferred in the practice of the invention. Block or graph copolymers of the same general type are also within its purview. These acrylonitrile polymers and copolymers may contain other monoolefinic monomers such as acrylic, haloacrylic, and methacrylic acids; esters such as methyl, butyl, octyl, methoxymethyl, and chloroethyl methacrylates and the corresponding esters of acrylic and haloacrylic acids; methacrylonitrile; vinyl and vinylidene halides such as methacrylonitrile; vinyl and vinylidene halides such as vinyl chloride, vinyl fluoride, vinylidene chloride, 1-fluoro-1-chloroethylene; vinyl carboxylates such as vinyl acetate, vinyl chloroacetate, vinyl propionate, and vinyl stearate; N-vinylimides such as N-vinylphthalimide, and N-vinylsuccinimide, N-vinyllactams such as N-vinylcaprolactam and N-vinylbutyrolactam; aryl compounds such as styrene and vinyl naphthalene, and other compounds such as methyl vinyl ketone, methyl fumarate, methyl vinylsulfone, fumaronitrile, maleic anhydride, the vinyl pyridines such as 2-vinylpyridine, and 4-vinylpyridine, the vinyl-substituted alkyl pyridines such as 4-ethyl-2-vinylpyridine, 5-ethyl-2-vinylpyridine, and 2-methl-5-vinylpyridine; the isomeric vinylpyrazines, the various isomeric vinylquinolines, the vinylimidazoles and the vinylbenzoxazoles.

The blended polymers containing at least 80 percent acrylonitrile may, for example, comprise a major amount of a polymer (A) containing at least 85 percent acrylonitrile and up to 15 percent of one of the above-named monoolefinic monomers copolymerizable therewith. Preferably, these blended polymer compositions contain from 50 to 98 percent of polymer (A), containing at least 85 percent acrylonitrile and up to 15 percent of another monoolefinic monomer copolymerizable therewith, and from 2 to 50 percent of polymer (B), containing at least 30 percent of a vinyl-substituted alkyl pyridine monomer and up to 70 percent of another monoolefinic monomer copolymerizable therewith, polymers (A) and (B) being so proportioned that the polymer blend contains from 2 to 15 percent of the vinyl-substituted alkyl pyridine monomer in polymerized form.

The following examples are presented by way of further illustration of the invention, but should not be construed as limiting. All parts and percentages, including those in the examples, are by weight unless otherwise indicated. A number of these examples are set forth in Table I below. Films formed from an acrylonitrile polymer containing various additives are referred to in this table together with the virgin acrylonitrile polymer as a control. The results of the burn test and some remarks, where appropriate, are also presented. Inasmuch as relatively thin films were being tested, it proved desirable to provide several tests for each example. Accordingly, five specimen were separately tested and the average results were presented as the example. This procedure was considered better because it proved difficult to provide the desired uniformity of the specimen, especially in thickness, and also the burn test, while providing reliable comparative data, was thought to provide more reproducible results if this procedure were utilized.

In order to provide the specimen, 20 grams of virgin acrylonitrile polymer were mixed with 80 grams of dimethylformamide and tumbled until a homogenous solution was obtained. To this solution was added the required amount of the fire retardant additive to provide the composition under test, and the resulting mixture was again tumbled until a homogenous solution was produced. If necessary, the resulting solution was allowed to stand at room temperature until entrapped air bubbles escaped. The films were then cast from the resulting solution on a glass plate using a doctor blade. The solvent was evaporated by placing the coated plate in a forced draft oven at about 55° C. for a period of 16 hours. The dried films were then peeled off of the glass plate and were immersed in a 70° C. water bath for a period of 30 minutes. They were then dried and placed in a forced draft oven at 55° C. for 2 hours. After this drying operation was completed, the films were cut into strips 4" x 2" in size. The thickness of the film was controlled by the doctor blade to provide a film thickness of very nearly 10 mils, although as indicated above, this particular dimension is rather difficult to provide with accuracy from specimen to specimen.

In order to determine the relative flame retardancy of the various examples of Table I, each of the strips referred to above was individually placed in a steel frame. The specimen and the frame were then mounted in a test chamber and subjected to a standard flame under controlled conditions. The specimen was held in a vertical position along its side edges and was positioned with respect to a bunsen burner so that its lower edge just extended into the burner flame when the burner was adjusted with a wing tip to provide a flame 1¼ inches in height. The test was conducted in a closed cabinet and the specimen was subjected to the flame of the bunsen burner for 12 seconds. The burner was then extinguished. If the specimen did not ignite, it was subjected to a second attempt and was considered non-burning by this test if it did not ignite after the second attempt. It was considered self-extinguishing by this test if the flame went out prior to consuming the entire film. The time that the flame required to consume the entire film was measured and, of course, provided a measure of the flame retardancy. The faster the whole film was consumed, the more flammable the specimen.

If the flame extinguished itself, the time required for the flame to reach this point was measured. Of course, it would require more time to consume the entire film, but under the circumstances, this could not be measured. But the burn time to the self extinguishing point provides an approximate measure of the flame retardancy nevertheless. For instance, if it required 39 seconds for the flame to char approximately ⅕ of the film (Example 6), obviously the results are much better than those for the control or for most of the other examples. However, direct comparisons of burn time from example to example are more significant where all of the specimen compared were consumed. The burn rate; that is, the burn time per unit of area charred could be determined in theory to provide a better comparison between a consumed specimen and a self-extinguishing one. But under the conditions of this test, such burn rates were not considered sufficiently reproducible since the extent of the char provide difficult to measure accurately enough. The area of each of the specimen consumed could be measured accurately of course. However, as noted above, the test clearly established, in general, the superior fire retardancy of the self-extinguishing specimen. In fact for one example shown in Table I (Example No. 13), the specimen were almost but not quite non-burning. It required three attempts to ignite each of them, on the average, and the area of char was very small. Under these circumstances, it was not considered possible to obtain an accurate burn time, although, of course, this material was the most fire retardant of those tested since it was very nearly non-burning. But under these conditions, the time required to consume the film or to reach a certain point could not be significantly judged.

This test is a variation or modification of the AATCC test, such modifications being necessary to test plastic films. The principal differences from the standard test result from a smaller sized specimen and the fact that length of char for the self-extinguishing specimen were measured directly on the specimen rather than to a tear point, as contemplated in the unmodified AATCC test, the latter procedure being appropriate for textile materials. The AATCC test, 34–1966 (USA Standard Institute: USAS L 14.107–1966) was devised by the American Association of Textile Chemists and Colorists. It was approved as standard in 1952 and was revised in 1966—see the Technical Manual of the American Association of Textile Chemists and Colorists, B 135 and 136, published for the Association by Howes Publishing Company Inc., 14 E. 23rd St., New York, N.Y.

the molar ratio of bromine to chlorine in said additive being within the range of 3:1 to 1:3.

3. A flame retardant acrylonitrile film or fiber according to claim 2 in which about 10% by weight of the film or fiber consists essentially of tris(2,3-dibromopropyl) phosphate and about 5% thereof consists essentially of

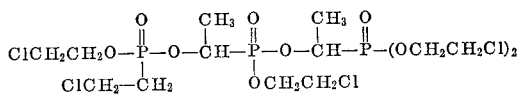

TABLE I

| Example | Burning time, seconds | Remarks |
| --- | --- | --- |
| (1) Control | 11 | Consumed. |
| (2) 5% T23P | 14 | Do. |
| (3) 10% T23P | 19 | Do. |
| (4) Phosgard C-22-R | 13 | Do. |
| (5) 10% Phosgard C-22-R | 21 | Do. |
| (6) 5% T23P plus 5% Phosgard C-22-R | ¹ 39 | ⅓ of film charred. |
| (7) 7% T23P plus 3% Phosgard C-22-R | 33 | Consumed. |
| (8) 3% T23P plus 7% Phosgard C-22-R | ¹ 43 | ¼ of film charred. |
| (9) 10% T13P | 17 | Consumed. |
| (10) 5% T13P plus 5% Phosgard C-22-R | 37 | Do. |
| (11) 15% T23P | 31 | Do. |
| (12) 15% Phosgard C-22-R | 29 | Do. |
| (13) 10% T23P plus 5% Phosgard C-22-R | (²) | Three ignitions—very little char. |

¹ Time until flame was extinguished.
² Very nearly non-burning—burn time too difficult to judge accurately.
NOTE.—T23P is tris (2,3-dibromopropyl) phosphate; T13P is tris (1-bromo-3-chloroisopropyl) phosphate; the structural formula for "Phosgard" C-22-R is provided hereinbefore.

What is claimed is:

1. A flame retardant composition comprising an acrylonitrile polymer having incorporated therein about 5% to about 20% by weight of an additive consisting essentially of tris(2,3-dibromopropyl) phosphate and

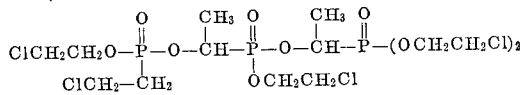

the molar ratio of bromine to chlorine in said additive being within the range of 3:1 to 1:3.

2. A flame retardant acrylonitrile film or fiber having incorporated therein about 10% to about 15% by weight of an additive consisting essentially of tris(2,3-dibromopropyl) phosphate and

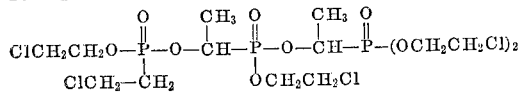

References Cited

UNITED STATES PATENTS

| | | | |
| --- | --- | --- | --- |
| 3,058,941 | 10/1962 | Birum | 260—30.6 |
| 3,149,089 | 9/1964 | Hayes | 260—32.6 |
| 3,242,124 | 3/1966 | Lowes, Jr. | 260—29.6 |
| 3,313,867 | 4/1967 | Blackburn et al. | 260—895 |
| 3,403,118 | 9/1968 | Listner | 260—23 |
| 3,412,052 | 11/1968 | Taylor et al. | 260—2.5 |
| 3,445,404 | 5/1969 | Ronden et al. | 260—2.5 |
| 3,513,119 | 5/1970 | Cannelongo | 260—28.5 |
| 3,255,145 | 6/1966 | Graham | 260—30.6 |

DONALD E. CZAJA, Primary Examiner

R. A. WHITE, Assistant Examiner

U.S. Cl. X.R.

106—15 FP; 260—30.6 R